Patented Sept. 4, 1951

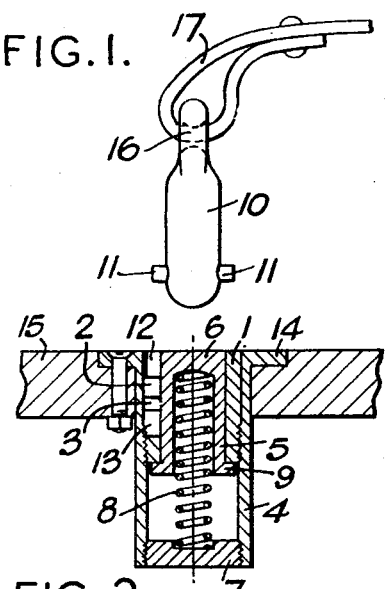
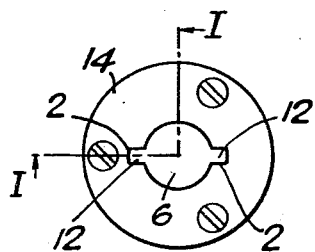
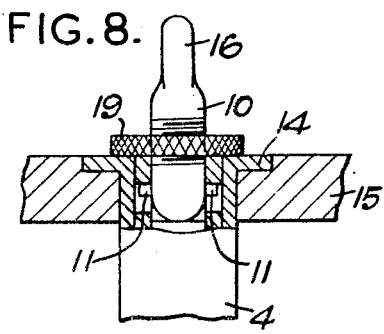
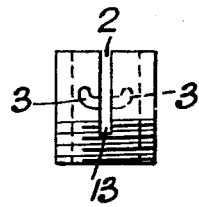
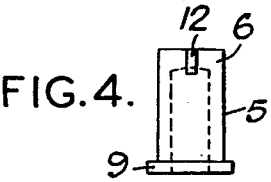
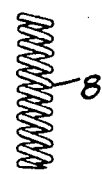
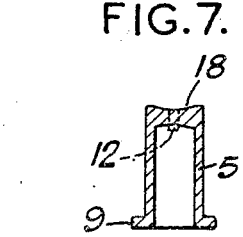

2,567,069

UNITED STATES PATENT OFFICE 2,567,069

DETACHABLE CONNECTOR

Frank Bernard Harley, Camberley, England, assignor to Aerolex Limited, Camberley, England Application October 1, 1948, Serial No. 52,191
In Great Britain December 15, 1947

2 Claims. (Cl. 24—221)

This invention relates to detachable connectors.

The main object of this invention is to provide a quick release connector which is simple and little liable to derangement while at the same time providing for the flush closure of the receiving or socket part of the connector.

According to one feature of the present invention a quick release connector comprises a socket part, a plug part these two parts being respectively shaped to provide the components of a bayonet projection and socket connection, a plunger in the socket part the plunger having a contour corresponding to the entrance contour of the socket part and the plunger having an outer face which is formed with a locating recess for the end of the plug part, spring means in the socket part urging the plunger outwardly of the socket and means limiting the outward movement of the plunger with its outer face flush with the outer face of the socket part and closing the receiving contour thereof.

According to a further feature of the invention a quick release connector comprises a socket part, a plug part, these two components being respectively shaped to provide the components of a bayonet projection and socket connection, a plunger in the socket part, the plunger having a contour corresponding to the entrance contour of the socket part, spring means in the socket part urging the plunger outwardly of the socket, means limiting the outward movement of the plunger with its outer face flush with the outer face of the socket part and closing the receiving contour thereof and means to lock the plug part against releasing movement from the socket part.

The invention is illustrated in the accompanying drawing in which Figure 1 is a vertical sectional elevation taken on the line 1—1, Figure 2, Figure 2 a plan view of Figure 1, Figures 3–6 are views of the various component parts of the socket, Figure 7 a detail section of a modification and Figure 8 a sectional elevation of a modified form of plug component.

Referring firstly to Figures 1–6, the socket part of a bayonet and socket connector is formed by a hollow cylindrical sleeve 1 having formed in it at one end the familiar bayonet slots 2, with returned portions 3, these slots being masked by an outer cupped sleeve 4 which screws on to the sleeve 1 and which also closes the end of the sleeve 1 remote from the slots: the sleeve 4 may be made in two parts which separately screw on to the sleeve 1, the division being indicated by the dotted lines in Figure 6.

Disposed within the bore of the sleeve 1 is a hollow plunger 5 having a blanked-off end 6 and between this blanked-off end and the blanked-off end 7 of the sleeve 4 is housed a compression coil spring 8 which operates to urge the end of the plunger 5 into the receiving mouth of the sleeve 1: the plunger 5 is formed with a flange 9 which is so disposed as to abut the inner end of the sleeve 1 when the blanked-off end 6 of the plunger is flush with the outer extremity of the receiving end of the sleeve 1.

The plug part of the connector, this part being indicated at 10, comprises a cylindrical portion which is a snug sliding fit in the bore of the sleeve 1, the plug having the usual bayonet pins 11 to enter snugly into the bayonet slots 2, 3.

As is clear from Figure 1, when the plug is applied to the socket, its end is pressed against the end 6 of the plunger 5 which is then moved by the plug into the sleeve 1 against the action of the spring 8 until when the pins 11 register with the returned parts 3 of the slots 2, the plug 10 is turned about its axis to move the pins into those returned parts. The spring 8 now reacts and holds the pins 11 in the returned portions 3 to hold the plug 10 releasably in position. When subsequently the plug 10 is removed by the reverse operation, the blank end 6 of the plunger 5 is caused by the spring 8 to follow up the plug until, when the flange 9 comes against the end of the sleeve 1, the plunger is arrested with its blank end 6 flush with the end of the sleeve 4. By this means the socket is closed automatically when the plug is removed and the entry of dirt and dust is prevented.

It is preferred also to close the receiving ends of the relatively small openings left by the slots 2 in the sleeve 1, and for this purpose the plunger 5 has ears 12 which extend slidably into the slots 2 which are in such a case extended at 13 past the returned part of the slot to accommodate the ears 12 when the plunger 5 is depressed by the insertion into the socket of the plug 10.

While for convenience of manufacture the slots 2, 3 can be formed by cutting completely through the wall of the sleeve 1 and then masked by fitting the outer sleeve 4 over the first, the slots could as shown be replaced by grooves formed on the inner surface of the first sleeve 1 to provide in effect "blind" slots.

Where the socket part is intended to be used in a fixed position (e. g. in aeroplanes and ships to provide an anchorage for ropes, straps and so on) a securing flange 14 would be provided to receive securing screws or bolts by which the socket assembly can be secured to say a floor or bulk-head 15 as indicated in Figure 1.

The outer or head end of the plug 10 is formed in various ways for different uses: thus, the head can be provided as shown in Figure 1 with an eye-piece 16 through which can be threaded a strap or a strainer wire or rope 17: it can be fitted with a swivel which may be in the form of an anchorage plate for one or more wires or ropes to provide a multiple anchorage plate or it can be of usual form to receive a loop at the end of a wire or rope.

In order to enable the plug 10 to be easily located to the plunger 5 when it is desired to establish a connection to the socket, the blank-end 6 of the plunger 5 can as is shown in Figure 7, be formed with a concavity 18 which will operate to centre the end of the plug: this concavity can be coloured to facilitate the location.

Reference is now made to Figure 8 which shows the provision of a device for locking the two parts of the connector together; as is shown in Figure 8 the device is applied to the plug 10 and it comprises a screwed ring 19 which, being screwed back on the plug to enable the two parts to be presented through the pin and slot connection, is then screwed out on the plug to abut the socket part and in this way to prevent the plug part from being pressed-in against the spring 8 and so preventing the joint from being inadvertently "broken."

To facilitate the handling of the plug part, it may have secured to it an operating pin or finger piece extending to a dimension beyond the sleeve.

The device of this invention affords a rapid means for connecting parts together in a releasable fashion: for example, where in an aircraft it is desired to provide a number of anchorages at different points, a socket component would be fitted at each point and then, as circumstances dictate, a plug component could be plugged into the appropriate socket. A number of the sockets could be mounted in the floor and by reason of the automatic closing of the sockets they are little liable to derangement through dirt and so on: the flush fitting of the sockets also causes them to present no obstruction when they are not in use.

The devices could also be applied for example to providing an anchorage for lines (such as clothes lines) which would have at one or both ends a plug part.

Another application of the invention consists in providing for the detachable connection of seats to a floor such as that of an aeroplane: in such a case, a socket could be disposed in an open or box-like casing which is sunk into and fitted flush to the floor, while the lower ends of the legs of the seat are formed to constitute the plugs.

While the bayonet and socket connector of this invention is mainly for use as a floor, wall or roof fitting, it is to be understood that it is capable of quite general application and need not be arranged for fixed locations: for example the socket component could be modified to provide a double-ended socket with a closure at both ends, such a case arising where the socket components are to be used as a connector between say the ends of lengths of wire or between straps and so on; the automatic closure ensures that the socket ends will at all times be maintained clear from obstruction by the entry of dirt and so on.

What I claim is:

1. A quick release connector comprising a socket part, a plug part, these two parts being respectively shaped to provide the components of a bayonet projection and socket connection, a plunger in the socket part, the plunger having a contour corresponding to the entrance contour of the socket part and the plunger having an outer face which is formed with a locating recess for the end of the plug part, spring means in the socket part urging the plunger outwardly of the socket and means limiting the outward movement of the plunger with its outer face flush with the outer face of the socket part and closing the receiving contour thereof.

2. A quick release connector comprising a socket part, a plug part, these two parts being respectively shaped to provide the components of a bayonet projection and socket connection, a plunger in the socket part, the plunger having a contour corresponding to the entrance contour of the socket part, spring means in the socket part urging the plunger outwardly of the socket, means limiting the outward movement of the plunger with its outer face flush with the outer face of the socket part and closing the receiving contour thereof and means to lock the plug part against releasing movement from the socket part.

FRANK BERNARD HARLEY.

REFERENCES CITED

The following references are of record in the file of this patent:

UNITED STATES PATENTS

| Number | Name | Date |
|---|---|---|
| 942,330 | Jones et al. | Dec. 7, 1909 |
| 1,367,350 | Bourque | Feb. 1, 1921 |
| 1,652,575 | McGinley | Dec. 13, 1927 |
| 2,123,068 | Summers | July 5, 1938 |
| 2,429,190 | McArthur | Oct. 14, 1947 |